Jan. 21, 1964   N. S. BERGLUND   3,118,291
AXIALLY MOVABLE COUPLING
Filed Oct. 9, 1961
Fig. 1.
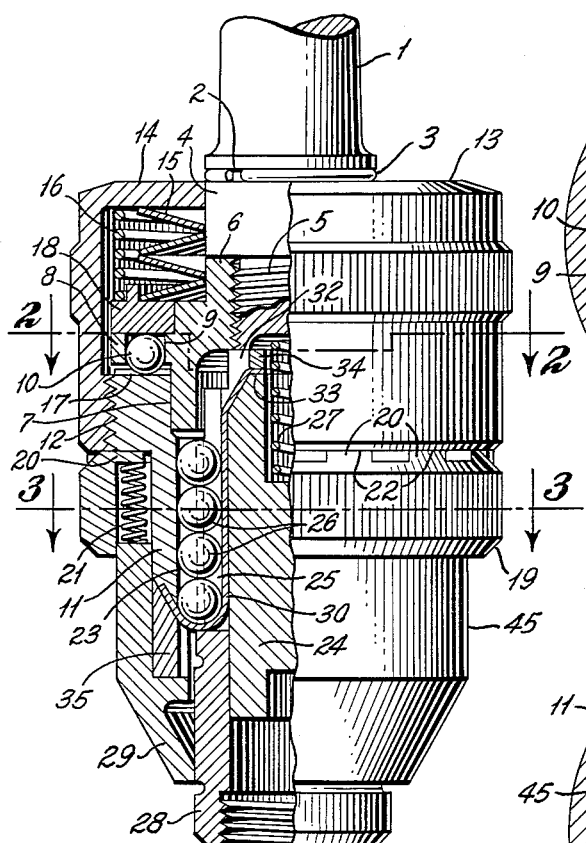
Fig. 2.
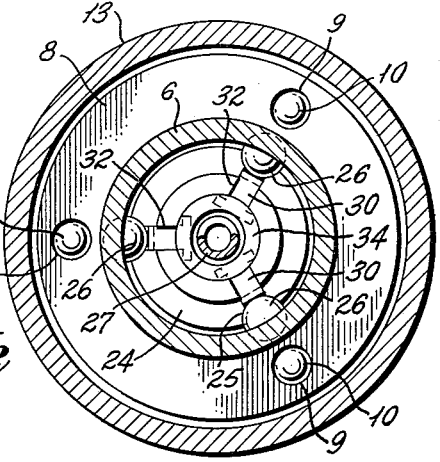
Fig. 3.
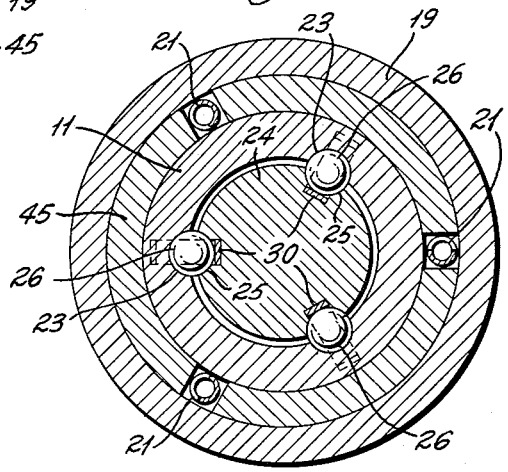
Fig. 5.
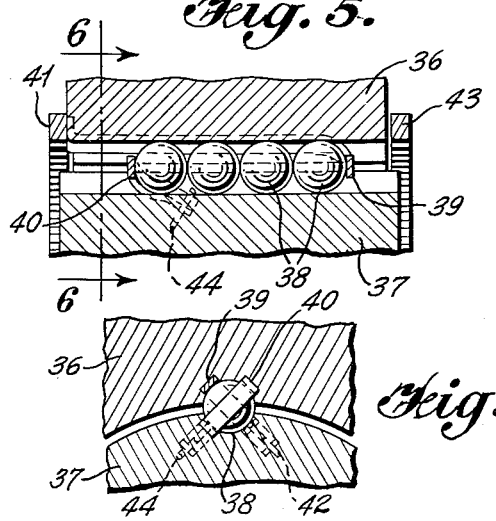
Fig. 4.
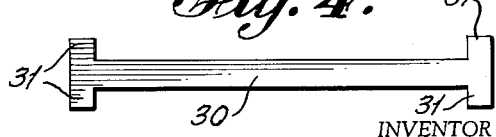
Fig. 6.
INVENTOR
Nils Sture Berglund
BY J. Delattre-Seguy
ATTORNEY United States Patent Office 3,118,291
Patented Jan. 21, 1964

3,118,291
AXIALLY MOVABLE COUPLING
Nils Sture Berglund, Nacka, Sweden, assignor to Ingenjorsfirma A. Alfredeen AB, Bandhagen, Sweden
Filed Oct. 9, 1961, Ser. No. 143,926
Claims priority, application Sweden Oct. 13, 1960
9 Claims. (Cl. 64—23.7)

This invention relates to a device in such concentric machine elements which are axially movable relative to each other, and in which a rotary motion of one element is to be transmitted to the other element by means of one or more balls placed in grooves provided opposite each other in pairs in the external surface of one element and the internal surface of the other element. The device is particularly intended for use with thread cutting appliances.

Many mechanical constructions, and especially certain thread cutting appliances, are provided with a driving element intended for connection to a rotary part of a machine, and an element driven by the driving element and carrying a tool, such as a thread cutting tool. Transmission of the rotary motion from the driving element to the driven element is often effected by means of balls placed in grooves, which are provided opposite each other in pairs in opposed cylindrical surfaces on the driving and the driven element. Arranged in this way the balls allow relative axial movement of the elements but prevent relative rotation.

With constructions of this type it has proved difficult to synchronize the movements of the balls in relation to the axial positions of the elements relative to each other. In some cases, for instance in the device described in the Swedish specification 126,034 a ball is placed in a ball cage which is mounted between the opposed cylindrical surfaces of the driving element and the driven element. However, this method involves the drawback that the distance between the said surfaces of the driving and the driven element must be rather large, and thus the radial forces occurring particularly in the outer element are greater than is desirable. In such constructions, therefore, there is always a risk of cracks forming in the outer element, and the moment-transmitting balls will easily break. The axial guidance of the driving and driven elements is not effected by the moment-transmitting balls, but by other, smaller balls which are fitted in the same ball cage that carries the first mentioned balls.

Another method for synchronizing the moment-transmitting balls is used in the thread cutting appliance described in the Swedish specifications 170,636 and 170,637. In those, the opposed, open grooves accommodating the moment-transmitting balls are made with such a small tolerance that the balls are clamped in their relative positions while rolling in the grooves. It is, however, difficult to obtain so small tolerances, and for this reason the method draws high manufacturing costs, although involving the advantage that no special guiding device for guiding the parts relative to each other is necessary, since they are guided by the moment-transmitting balls.

The synchronizing of the balls in relation to the relative axial positions of the driving and the driven element is very important, as the balls will otherwise roll or slide to the lower ends of the grooves and the rolling friction be replaced by sliding friction.

The present invention has for its object to provide a device, in which the balls are synchronized in relation to the axial positions of the driving and the driven element without necessitating a too large interspace between the elements and too fine tolerances in the manufacturing.

The outstanding feature of the device according to the invention is that the positions of the balls in the axial grooves are determined in relation to the relative axial positions of the elements by means of one or more bands or threads running from one end of the grooves in one element between the groove bottoms and the balls, and around the ball located remote from the band's or thread's fixing point in the first element to a fixing point in the other element.

With elements which are rotary around a vertical axis a band or thread can be fixed at the upper groove end of one element and extend under the ball or balls, and be fixed to the other element. With elements which are rotary around a horizontal axis two bands or threads can be fixed each to one of the groove ends of one element and run around the balls, and be fastened to the other element.

A band for synchronization of the balls may preferably be made of a rather thin material with good flexibility, such as thin steel foil. The band ends may be provided with fixing laps, which project angularly from the band edge and can be inserted, for mounting of the band, from the groove ends into a trace milled in the element in question, in which trace they can be clamped.

As the balls should preferably not roll directly on the bands, it is better to insert the latter in recesses made in the already mentioned axial grooves in the elements. When several bands or threads are used, they should be placed in planes extending through the common axis of the balls and forming an angle with each other. In this way the bands will, in relative respect, cross each other as viewed from the groove end.

The invention is described in detail below, reference being made to the accompanying drawing in which FIG. 1 is a thread cutting appliance, partly in longitudinal section, FIG. 2 is a section along the line II—II in FIG. 1, FIG. 3 is a section along the line III—III in FIG. 1, FIG. 4 shows a thin steel band used in the thread cutting appliance for synchronizing purposes, FIG. 5 is a partial section through a row of balls in an element which is rotary around a horizontal axis, and FIG. 6 is an end view of the grooves with balls according to FIG. 5.

In the drawing, the numeral 1 designates a mandrel for fixing in a machine spindle, for instance in a drilling machine. The mandrel is provided with a groove 2 for a lock ring 3, a cylindrical guide surface 4, and a threaded end 5. A transmission part 6, provided with a cylindrical portion 7 and an outwardly projecting flange 8 is screwed on to the threaded end 5. The flange 8 has a number of holes 9 paralleling the axis of the part 6. The holes 9 accommodate balls 10. The driving element 11 is rotary on the cylindrical guiding surface 7. This element has an external thread 12 on which a sleeve 13 is screwed fast. The sleeve 13 is provided with a bottom 14, between which and a ring, that can be pressed against the flange 8, springs 15 and 16 are placed. The springs comprise an inner portion of so-called plate springs 15 and an outer cylindrical helical screw spring 16. The end of the driving element 11 facing the balls 10 is provided with radial grooves 17 in which the balls 10 are pressed down by the springs 15 and 16 via a washer 18. Driven on to the lower end of the driving element 11 is an outer sleeve 45, a ratchet ring 19 being fitted so as to be radially unmovable but axially movable in relation to the sleeve 45. The ratchet ring 19 has teeth 20 which can be pressed by spring action 21 into corresponding notches 22 in the lower end of the sleeve 13.

By displacement of the ratchet ring 19 downward in the figure the teeth 20 are released from the notches 22 and the sleeve 13 can be screwed upwards or downwards for adjustment of the pressure exerted on the balls 10. In this way the spring-loaded balls 10 will serve as overload guards and become disengaged if the driving element 11 is overloaded.

The driving element 11 is provided on its inside with axial grooves 23, in a preferred embodiment with three such grooves. The driven element 24 is mounted in the driving element 11. The driven element 24 is provided with external, axial grooves 25 corresponding to the grooves 23 of the driving element 11. Inserted in these groove pairs, 23, 25 are moment-transmitting balls 26. A spring 27 is provided between the end 5 of the mandrel 1 and the driven element 24. A collet 28 for fixing of screw taps or the like is driven on to the lower part of the driving element 11. The collet 28 is guided in an inwardly inclined guide 29 on the sleeve 45.

The balls 26 are synchronized in relation to the relative axial positions of the driving element 11 and the driven element 24 by means of a steel band 30 for each row of balls. The steel band 30 is shown more clearly in FIG. 4, from which it appears that the band has a longitudinal portion and is provided at its ends with fixing lugs 31 projecting from its edges. One end of the steel band 30 is fastened at one end of the driven element 24, which is in this place provided with a milled-down trace 32, and inside the latter is a cylindrical recess 33. The end of the steel band is clamped against the inside of the recess 33 by means of a lock ring 34. The other end of the steel band 30 is fastened in similar manner at the lower end of the driving element 11, where a lock ring 35 is driven on to this purpose.

Each band 30 is sunk in an axial recess in the bottom of the grooves 23, 25, as the band should not be permanently exposed to the rolling of the balls.

It appears from FIG. 1 that the driven element 24 is axially displaceable relative to the driving element 11, and during this axial displacement the parts are prevented from turning relative to each other by the balls 26. The balls 26 rest on the steel bands 30 and thus partake in the vertical movements of the driven element 24, assuming a position in the groove corresponding to the relative axial positions of the elements.

As already mentioned, the device can also be used with elements which are rotary about a horizontal axis. A partial section and an end view of such a device are shown in FIG. 5 and FIG. 6, where the driving element 36 and the driven element 37 are axially movable relative to each other in the horizontal direction and the balls 38 placed in grooves between the elements are synchronized in relation to the axial positions of the elements 36 and 37 by means of two steel bands 39 and 40. The steel band 39 is fastened to one end of the driving element 36 by means of a lock ring 41 and to the driven element 37 by means of a conical pin 42. The steel band 40 is fastened in similar way by means of a lock ring 43 and a conical pin 44.

The balls in FIG. 5 being placed between two steel bands 39 and 40, their positions will always be synchronized in relation to the relative axial positions of the elements 36 and 37. However, the steel bands 39 and 40 must not lie in the same plane but should, as shown in FIG. 6 lie in planes extending through the common axis of the balls and forming an angle with each other. In this way the bands will, relatively seen, cross each other, as viewed from one end of the ball row.

In the foregoing text, the bands have been described as steel bands. However, the bands must not necessarily be made of steel, but may as well consist of some other material, such as Phosphor bronze or another thin, flexible and strong material. One or more threads could be used instead of a band. Furthermore, a band could be replaced by one or more threads.

It is obvious that invention is not confined to the embodiments described above and shown in the drawing but may be modified in several ways without abandonment of the inventional spirit.

What I claim is:

1. In a torque transmitting telescopic joint, the combination of an outer sleeve member having an internal wall and axially extending grooves in said internal wall, an inner slide member radially enclosed in said outer sleeve member, said inner slide member having a circumferential wall and axially extending grooves in said circumferential wall, said latter grooves registering pair by pair with said grooves in said outer sleeve member; at least one torque transmitting ball movable along and received within each registering pair of grooves and permitting the relative telescopic movement of said inner and outer members with reduced friction; and ball positioning means within each said pair of grooves; said latter means comprising at least one flexible, relatively narrow sling member having its ends respectively secured to said inner slide member and to said outer sleeve member, thereby forming therebetween and in said pair of registering grooves a translationally movable, ball suspending, loop.

2. In a torque transmitting telescopic joint, the combination as claimed in claim 1, in which said sling member is a narrow, flexible strip of thin sheet metal.

3. A torque transmitting telescopic joint as claimed in claim 2, in which the respective ends of said sheet metal strip are provided with lateral projections (31) facilitating their attachment to the outer sleeve member and to the inner slide member respectively, and in which at least one of said members presents means (32) for anchoring such a strip end near one end of its related groove.

4. In a torque transmitting telescopic joint, the combination as claimed in claim 1, in which each of said grooves in said inner slide member and outer sleeve member respectively are axially recessed to receive said sling members between wall portions of said grooves forming the actual ball races.

5. In a torque transmitting telescopic joint, the combination as claimed in claim 1, in which several balls are provided in each pair of registering grooves, said balls being in contact with each other to form a row suspended in said loop formed by said sling member.

6. In a torque transmitting telescopic joint, the combination of an outer sleeve member having an internal wall and axially extending grooves in said internal wall; an inner slide member having a circumferential wall and enclosed radially by said outer sleeve member and having axially extending grooves in said circumferential wall; said latter grooves registering with said grooves in the outer sleeve member to form pairs of grooves; a least one torque transmitting ball movable and received within each registering pair of grooves to permit relative telescopic movement of said inner and outer members with reduced friction; ball positioning means within each pair of grooves, said latter means comprising for each pair of grooves two flexible, relatively narrow sling members, each of the latter having one of its ends secured to said inner slide member and its other end secured to said outer sleeve member and forming between said members a translationally movable ball enclosing loop in each said pair of registering grooves, the loops formed by said two sling members approaching said ball from opposite directions and lying in angularly offset planes relative to each other.

7. In a torque transmitting telescopic joint, the combination as claimed in claim 6, wherein each of said sling members is a narrow, flexible strip of thin sheet metal.

8. In a torque transmitting telescopic joint, the combination as claimed in claim 6, in which each of said grooves in said inner slide member and outer sleeve member respectively are axially recessed to receive said sling members between such wall portions of said grooves as form the actual ball races.

9. In a torque transmitting telescopic joint, the combination as claimed in claim 6, in which several balls are provided in each pair of registering grooves, said balls being in contact with each other to form a row enclosed by said loops formed by said two sling members.

References Cited in the file of this patent

UNITED STATES PATENTS

| | | |
|---|---|---|
| 754,066 | Hoffmann | Mar. 8, 1904 |
| 2,313,279 | Suczek | Mar. 9, 1943 |
| 2,341,947 | Roberts | Feb. 15, 1944 |
| 2,952,145 | Thompson | Sept. 13, 1960 |